(12) United States Patent
Hatanaka et al.

(10) Patent No.: US 9,537,356 B2
(45) Date of Patent: Jan. 3, 2017

(54) POWER SUPPLIER AND RECEIVER AND MOBILE DEVICE

(71) Applicant: NITTO DENKO CORPORATION, Ibaraki-shi, Osaka (JP)

(72) Inventors: Takezo Hatanaka, Ibaraki (JP); Hisashi Tsuda, Ibaraki (JP)

(73) Assignee: NITTO DENKO CORPORATION, Ibaraki-Shi (JP)

( * ) Notice: Subject to any disclaimer, the term of this patent is extended or adjusted under 35 U.S.C. 154(b) by 0 days.

(21) Appl. No.: 14/964,155

(22) Filed: Dec. 9, 2015

(65) Prior Publication Data

US 2016/0111893 A1 Apr. 21, 2016

Related U.S. Application Data

(63) Continuation of application No. 14/422,228, filed as application No. PCT/JP2014/064157 on May 28, 2014, now Pat. No. 9,325,207.

(30) Foreign Application Priority Data

Jul. 8, 2013 (JP) ................................ 2013-142555

(51) Int. Cl.
*H01F 27/42* (2006.01)
*H01F 38/14* (2006.01)
(Continued)

(52) U.S. Cl.
CPC ............... *H02J 50/12* (2016.02); *H01F 38/14* (2013.01); *H02J 5/005* (2013.01); *H02J 7/025* (2013.01); *H02J 17/00* (2013.01)

(58) Field of Classification Search
CPC ............. H02J 5/005; H02J 7/025; H02J 50/12
(Continued)

(56) References Cited

U.S. PATENT DOCUMENTS 7,764,158 B2 7/2010 Kubono et al.
8,482,159 B2 7/2013 Shimokawa
(Continued)

FOREIGN PATENT DOCUMENTS

CN 103038087 A 4/2013
EP 2367263 A2 9/2011
(Continued)

OTHER PUBLICATIONS

Jul. 1, 2014 Search Report issued in International Application PCT/JP2014/064157.
(Continued)

*Primary Examiner* — Daniel Cavallari
(74) *Attorney, Agent, or Firm* — Oliff PLC

(57) ABSTRACT

An arrangement place for a device such as a rectifier and a power storage device is easily secured. At the time of power supply using a resonance phenomenon, a power-receiving device generates a magnetic field space having a lower magnetic field strength than other parts at or around the inner side of the power-receiving module, and this magnetic field space is used as the arrangement place of an electronic component. The power-receiving module includes a power-receiving resonance coil which is resonated with a power-supplying module and a power-receiving coil which partly overlaps the power-receiving resonance coil in a coil diameter direction and receives and supplies power from and to the power-receiving resonance coil.

4 Claims, 4 Drawing Sheets

(51) Int. Cl.
*H02J 17/00* (2006.01)
*H02J 5/00* (2016.01)
*H02J 7/02* (2016.01)

(58) Field of Classification Search
USPC ........................................................ 307/104
See application file for complete search history.

(56) References Cited

U.S. PATENT DOCUMENTS

| | | |
|---|---|---|
| 8,575,782 B2 | 11/2013 | Yoshikawa |
| 2008/0030292 A1 | 2/2008 | Kubono et al. |
| 2010/0244578 A1 | 9/2010 | Yoshikawa |
| 2010/0244583 A1 | 9/2010 | Shimokawa |
| 2011/0193421 A1 | 8/2011 | Urano |
| 2012/0049645 A1 | 3/2012 | Kozakai |
| 2012/0194000 A1 | 8/2012 | Uchida |
| 2012/0326499 A1 | 12/2012 | Ichikawa et al. |
| 2013/0038281 A1 | 2/2013 | Sakakibara et al. |

FOREIGN PATENT DOCUMENTS

| | | |
|---|---|---|
| EP | 2394840 A2 | 12/2011 |
| EP | 2536002 A1 | 12/2012 |
| JP | 2008-029125 A | 2/2008 |
| JP | 2010-239777 A | 10/2010 |
| JP | 2010-239847 A | 10/2010 |
| JP | 2011120382 A | 6/2011 |
| JP | 2011-147213 A | 7/2011 |
| JP | 2012-049434 A | 3/2012 |

OTHER PUBLICATIONS

Nov. 3, 2015 Office Action issued in Chinese Patent Application No. 201480002178.8.
Mar. 2, 2016 Search Report issued in European Application No. 14823811.6.
May 11, 2016 Office Action issued in Chinese Application No. 201480002178.8.

FIG.4

| COIL LAYOUT | FIRST LAYOUT | SECOND LAYOUT | THIRD LAYOUT | FOURTH LAYOUT |
|---|---|---|---|---|
| APPEARANCE | | | | |
| CROSS SECTION | | | | |
| L3:L4 ($\mu$H) | 7.5:6.4 | 6.4:7.5 | 14.5:2.9 | 11.9:4.3 |
| R3:R4 ($\Omega$) | 1.9:1.5 | 1.5:1.9 | 2.9:1.0 | 2.4:1.4 |
| COUPLING COEFFICIENT | 0.85 | 0.85 | 0.85 | 0.85 |
| Zin@k12=0.457 | 27.4$\Omega$ | 26.3$\Omega$ | 42.6$\Omega$ | 34.4$\Omega$ |
| RECEIVING VOLTAGE(V) | 9.5V | 10.0V | 6.9V | 8.3V |
| CURRENT (A) OF RESONANCE COIL | 0.250 | 0.263 | 0.190 | 0.207 |

POWER SUPPLIER AND RECEIVER AND MOBILE DEVICE

This application is a continuation application of U.S. patent application Ser. No. 14/422,228 filed Feb. 18, 2015, which is in turn a U.S. National Stage of International Application No. PCT/JP2014/064157, filed May 28, 2014, which claims the benefit of Japanese Patent Application No. 2013-142555 filed Jul. 8, 2013. The disclosure of the prior applications is hereby incorporated by reference herein in their entirety.

TECHNICAL FIELD

The present invention relates to a power-receiving/supplying device and a portable device each of which receives and supplies power in a contactless manner by magnetic field resonance.

BACKGROUND

As a power supplying technology (wireless power transmission technology) utilizing wireless power transmission between a power-supplying device and a power-receiving device, much attention has been paid to a wireless power transmission technology with which power transmission is performed utilizing a resonance phenomenon between resonators (resonance coils) provided in a power-supplying device and a power-receiving device, respectively. For example, PTL 1 recites an electric vehicle in which a power-receiving device is provided above the floor surface of the body and a rectifier and a power storage device are provided in a space isolated from the power-receiving device, and also recites a system for supplying, when the electric vehicle is moved to a power supplying place, power from a power-supplying device provided at the power supplying place to the power-receiving device of the electric vehicle. PTL 2 recites an arrangement in which a wireless power transmission technology using the resonance phenomenon is employed in a portable computer.

CITATION LIST

Patent Literatures

[PTL 1] Japanese Unexamined Patent Publication No. 2011-147213
[PTL 2] Japanese Unexamined Patent Publication No. 2010-239847

SUMMARY OF INVENTION

Technical Problem

Devices such as the rectifier and the power storage device must be disposed in consideration of the influences of heat generation and magnetic power at the time of power supply. In a relatively large apparatus such as the electric vehicle of PTL 1 above, it is easy to secure arrangement places of the devices. However, there wound be strong demand for securing arrangement places of devices in consideration of effective utilization of a limited space in an apparatus. In particular, in a portable device such as a portable computer which is required to be small in size as described in PTL 2, a space where the influences of heat generation and magnetic power at the time of power supply are avoidable is limited. For this reason, the layout of the devices is extremely important to achieve further downsizing.

An object of the present invention is therefore to provide a power-receiving/supplying device and a portable device, in which arrangement places of devices such as a rectifier and a power storage device are easily secured.

Solution to Problem

A power-receiving/supplying device of the present invention includes: a coil module configured to receive and supply power from and to another coil module by a resonance phenomenon; and an electronic component provided in a magnetic field space which is formed by the resonance phenomenon to have a lower magnetic field strength than other parts, the coil module including: a resonance coil which is resonated with said another coil module; and a power-receiving/supplying coil which partly overlaps the resonance coil in a coil diameter direction and is configured to receive and supply power from and to the resonance coil.

According to the arrangement above, a magnetic field space (space part) having a low magnetic field is formed at or around the inner side of the coil module at the time of power receiving and supplying, and this magnetic field space is effectively used as an arrangement place of an electronic component. On this account, an arrangement place of an electronic component is easily secured even in a device such as a portable device in which the arrangement place of the electronic component is difficult to be found, and hence the disclosure can be used as a power-receiving/supplying device which achieves the downsizing of an apparatus.

Furthermore, in the arrangement above, because the resonance coil and the power-receiving/supplying coil are disposed to partly overlap one another in the coil diameter direction, the coil module is shortened in the coil axis direction. This makes it possible to downsize the power-receiving/supplying device in the coil axis direction. Furthermore, by adjusting the degree of overlap of the resonance coil and the power-receiving/supplying coil, it is possible to set, at a target value, one of control items such as a coupling coefficient between the coil module and the resonance coil in resonance, a receiving voltage, and a current of the coil module. In other words, by adjusting the degree of overlap of the coils, it is possible to easily set desired one of control items at a target value by adjusting the degree of overlap.

In the present invention, each of the resonance coil and the power-receiving/supplying coil may be a solenoid coil.

According to the arrangement above, the power-receiving/supplying device is significantly shortened when employing a solenoid coil which tends to be long in the coil axis direction. Furthermore, because the coil length in the coil axis direction is easily changeable, it is easy to set a desired one of the control items at a target value.

In addition to the above, a portable device of the present invention includes the power-receiving/supplying device arranged as above.

According to this arrangement, because the power-receiving/supplying device which is small in size is included in the portable device, required reduction in size and weight of the portable device is easily achieved.

The portable device of the present invention may include an outer wall member exposed to the outside, at least a part of the coil module of the power-receiving/supplying device being provided along a surface shape of the outer wall member.

According to the arrangement above, because the coil module is provided along the outer wall member, the limited internal space of the portable device is effectively utilized.

Advantageous Effects of Invention

An arrangement place for a device such as a rectifier and a power storage device is easily secured.

BRIEF DESCRIPTION OF DRAWINGS

FIG. 4 shows measurement results of different coil layouts.

DESCRIPTION OF EMBODIMENTS

The following will describe an embodiment of a power-receiving/supplying device. While the following description deals with a case where the power-receiving/supplying device is employed in a power-receiving device, the device may be employed in a power-supplying device or in both the power-receiving device and the power-supplying device.

(Power-Receiving Device)

Figure 1:
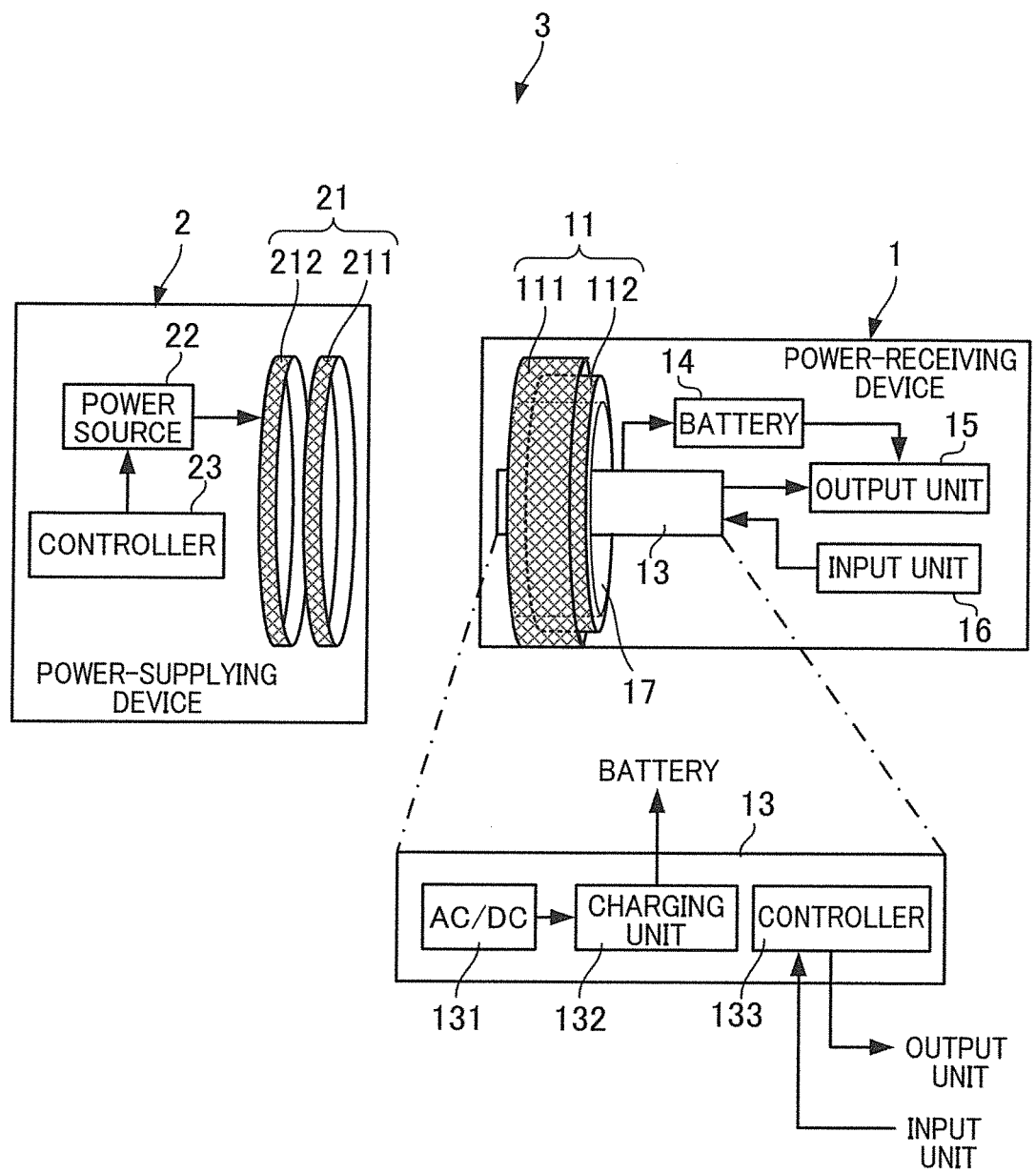
FIG. 1 is a schematic explanatory diagram of a power-supplying system including a power-receiving device in accordance with the present invention.

As shown in FIG. 1, a power-receiving device 1 which is the power-receiving/supplying device of the present embodiment is arranged such that, in power supply using the resonance phenomenon, a magnetic field space having a lower magnetic field strength than those of other parts is formed at or around the inner side of a power-receiving module 11, and an electronic component 13 is provided in this magnetic field space. To put it differently, the power-receiving device 1 (power-receiving/supplying device) includes a power-receiving module 11 (coil module) which receives and supplies power from and to a power-supplying module 21 (another coil module) by the resonance phenomenon and an electronic component 13 which is provided in the magnetic field space formed by the resonance phenomenon to have a lower magnetic field strength than the other parts. With this, the power-receiving device 1 can be downsized because malfunction and generation of heat equal to or higher than a predetermined temperature are prevented as the generation of an Eddy current by a magnetic field at the electronic component 13 provided in the above-described magnetic field space is restrained. Details of the magnetic field space having a low magnetic field strength will be given later.

The power-receiving module 11 in the power-receiving device 1 includes a power-receiving resonance coil 111 (resonance coil) which resonates with the power-supplying module 21 and a power-receiving coil 112 (power-receiving/supplying coil) which is provided to partly overlap the power-receiving resonance coil 111 in the coil diameter direction and receives and supplies power from and to the power-receiving resonance coil 111. To be more specific, the power-receiving module 11 includes the power-receiving resonance coil 111 provided on the outer circumference side and the power-receiving coil 112 which is provided on the inner circumference side of the power-receiving resonance coil 111 to partly overlap the power-receiving coil 111 in the coil diameter direction. Because the coil modules of the power-receiving device 1 are shortened in the coil axis direction, downsizing in the coil axis direction is achieved.

In addition to the above, the power-receiving device 1 is able to set, at a desired value, a desired one of control items such as a coupling coefficient between the power-supplying module 21 (power-supplying resonance coil 211) and the power-receiving resonance coil 111 which are in resonance, a receiving voltage, and a current of the power-receiving module 11, by adjusting the degree of overlap of the power-receiving resonance coil 111 and the power-receiving coil 112, and is able to change the size and location of the above-described magnetic field space. To put it differently, the power-receiving device 1 is able to easily set, at a desired value, a desired one of the control items while securing a desired magnetic field space, by changing the degree of overlap of the power-receiving resonance coil 111 and the power-receiving coil 112. The power-receiving device 1 may be arranged to perform the setting the control item, changing of the size of the magnetic field space, or the like, by determining on which one of the inner circumference side and the outer circumference side each of the power-receiving resonance coil 111 and the power-receiving coil 112 is disposed.

In addition to the above, the power-receiving device 1 includes a magnetic member 17 which is provided in the power-receiving module 11 to increase or decrease the magnetic coupling at the time of resonance. With this, as the magnetic member 17 increases or decreases the magnetic coupling between the power-receiving module 11 and the power-supplying module 21 in resonance, the power-receiving device 1 is able to easily satisfy the requirement in transmission efficiency of power supply for the power-receiving device 1 even if the distance between the power-supplying module 21 and the power-receiving module 11 cannot be changed, e.g., when the sizes and shapes of the power-receiving device 1 and the power-supplying device 2 are structurally unchangeable, and hence charging in a short time is becomes possible and overheating on account of quick charging is prevented. The power-receiving device 1 may not include the magnetic member 17.

The power-supplying module 21 includes a power-supplying resonance coil 211 which resonates with the power-receiving resonance coil 111 to supply power to the power-receiving module 11 by the resonance phenomenon and a power-supplying coil 212 which supplies power to the power-supplying resonance coil 211. The power-receiving resonance coil 111 and the power-receiving coil 112 of the power-receiving module 11 and the power-receiving resonance coil 111 and the power-receiving coil 112 of the power-supplying module 21 are formed by solenoid coils made of a copper wire material (coated with an insulation film). Because the solenoid coil tends to be long in the coil axis direction, the power-receiving device 1 and the power-supplying device 2 are conspicuously shortened. Furthermore, because the coil length of the solenoid coil is easily changeable in the coil axis direction, it is easy to set, at a desired value, a desired one of the control items in the power-receiving device 1 and the power-supplying device 2.

The power-receiving device 1 can be mounted on any types of apparatuses that operate based on power supply. For example, the power-receiving device 1 may be included in a portable device, a non-portable device, and vehicles such as a car. The portable device encompasses all types of handheld devices and wearable devices (devices attached to a human body).

Specific examples of the portable device include a portable computer (a laptop PC, a note PC, a tablet PC, or the like), a camera, an audio visual device (a mobile music player, an IC recorder, a portable DVD player, or the like), a calculator (such as a pocket computer and an electronic calculator), a game console, a computer peripheral (a portable printer, a portable scanner, a portable modem, or the like), a dedicated information device (an electronic dictionary, an electronic notebook, an electronic book, a portable data terminal, or the like), a mobile communication terminal, a voice communication terminal (a mobile phone, a PHS, a satellite phone, a third party radio system, an amateur radio, a specified low power radio, a personal radio, a citizen radio, or the like), a data communication terminal (a mobile phone, a PHS (a feature phone and a smart phone), a pager, or the like), a broadcasting receiver (a television receiver and a radio), a portable radio, a portable television receiver, a 1 seg receiver, another type of device (a wristwatch and a pocket watch), a hearing aid, a handheld GPS, a security buzzer, a flashlight/pen light, a battery pack, and an extracorporeal device (such as a sound processor and an audio processor) of an intracochlea implant system.

The portable device is preferably arranged such that at least a part of the power-receiving module 11 (coil module) is provided along the outer surface shape of an external wall member of a housing or the like which is exposed to the outside. When the power-receiving module 11 is disposed along the outside wall member in this way, the limited internal space of the portable device is effectively utilized.
(Power-Receiving Device 1: Magnetic Member 17)

The magnetic member 17 is made of a magnetic material. Examples of the magnetic material include soft magnetic materials such as pure Fe, Fe—Si, Fe—Al—Si (sendust), Fe—Ni (permalloy), soft ferrites, Fe-base amorphous, Co-base amorphous, and Fe—Co (permendur).

The magnetic member 17 may be made of resin in which magnetic powder of the above-described magnetic material is dispersed. The resin may be thermosetting resin or thermoplastic resin. Examples of the thermosetting resin include epoxy resin, phenol resin, melamine resin, vinyl ester resin, cyano ester resin, maleimide resin, and silicon resin. Examples of the thermoplastic resin include acrylic resin, vinyl acetate based resin, and poly vinyl alcohol based resin.

The magnetic member 17 is provided at least on the inner circumference side of the power-receiving resonance coil 111. The magnetic member 17 provided on the inner circumference side of the power-receiving resonance coil 111 enhances (increases) the magnetic coupling between the power-receiving resonance coil 111 and the power-supplying module 21 (power-supplying resonance coil 211) in resonance.

To enhance the magnetic coupling, the magnetic member 17 is preferably disposed as below when the power-receiving resonance coil 111 has the same coil diameter as the power-supplying module 21 and is disposed to oppose the power-supplying module 21.

That is to say, preferably, the magnetic member 17 is cylindrical in shape and extends along the inner circumferential surface of the power-receiving resonance coil 111, and the position of one end on the power-supplying module 21 side of the power-receiving resonance coil 111 is identical in the coil axis direction with the position of one end of the power-receiving module 11. With this arrangement, the cylindrical magnetic member 17 extending along the inner circumferential surface of the power-receiving resonance coil 111 enhances the magnetic coupling between the power-receiving resonance coil 111 and the power-supplying module 21 in resonance, and the magnetic field space is enlarged to reach the inner side of the power-receiving resonance coil 111.

In addition to the above, to enhance the magnetic coupling, the magnetic member 17 is preferably disposed as below when the power-receiving resonance coil 111 has the same coil diameter as the power-supplying module 21 and is disposed to oppose the power-supplying module 21 and the power-receiving coil 112 is provided on the side opposite to the power-supplying module 21 to have the same coil axis as the power-receiving resonance coil 111.

That is to say, the magnetic member 17 preferably includes a cylindrical portion which is formed to be cylindrical in shape and extend along the inner circumferential surfaces of the power-receiving resonance coil 111 and the power-receiving coil 112 and is arranged such that the position of one end on the power-supplying module 21 side of the cylindrical portion is identical with the position of one end of the power-receiving resonance coil 111 in the coil axis direction and the position of the other end of the cylindrical portion on the side opposite to the power-supplying module 21 side is identical with the position of the other end of the power-receiving coil 112 in the coil axis direction, and a disc-shaped portion which is provided at the other end of the cylindrical portion to oppose the other end face of the power-receiving coil 112. With this arrangement, the magnetic member 17 having the cylindrical portion which is cylindrical in shape and extends along the inner circumferential surface of the power-receiving resonance coil 111 and the disc-shaped portion disposed to oppose the power-receiving coil 112 further enhances the magnetic coupling between the power-receiving resonance coil 111 and the power-supplying module 21 (power-supplying resonance coil 211) in resonance, and the magnetic field space is enlarged to reach the inner side of the power-receiving resonance coil.

While in the present embodiment the magnetic member 17 is formed to be cylindrical in shape, the magnetic member is not limited to this shape and may be a dot or a stick in shape. Furthermore, while in the present embodiment the magnetic member 17 is disposed to enhance the magnetic coupling in resonance, the magnetic member 17 may be disposed to lower the magnetic coupling in resonance.

To be more specific, the magnetic member 17 may be arranged to be cylindrical in shape and extend along the outer circumferential surfaces of the power-receiving resonance coil 111 and the power-receiving coil 112, and include an external cylindrical portion in which the position of one end on the power-supplying module 21 side of the cylindrical portion is identical with the position of one end of the power-receiving resonance coil 111 in the coil axis direction, and the position of the other end of the cylindrical portion on the side opposite to the power-supplying module 21 side is identical with the position of the other end of the power-receiving coil 112 in the coil axis direction. With this arrangement, the degree (coupling coefficient) of the magnetic coupling can be lowered.

As such, the power-receiving device 1 may be arranged such that the degree (coupling coefficient) of the magnetic coupling is arbitrarily changeable by adjusting magnetic member conditions such as the position, shape, and size of the magnetic member 17. With this, the power-receiving device 1 is able to easily and arbitrarily change the degree of the magnetic coupling by adjusting the magnetic member conditions of the magnetic member 17, while maintaining the distance between the power-supplying module 21 and the power-receiving module 11 to be constant. For this reason, even if the distance between the power-supplying device 2 (power-supplying resonance coil 211) and the power-receiving device 1 (power-receiving resonance coil 111) is not changeable because, for example, the sizes and shapes of the power-receiving device 1 and the power-supplying device 2 are structurally unchangeable, the requirements for the power-receiving device 1 in transmission efficiency of the power supply are easily satisfied by increasing or decreasing the degree of the magnetic coupling by the magnetic member 17, and hence charging in a short time becomes possible and overheating on account of quick charging is prevented.

(Power-Receiving Device 1: Electronic Component 13 or the Like)

The above-described power-receiving device 1 includes at least one electronic component 13 including an electronic circuit and a battery 14 supplying power for operation. The power-receiving device 1 further includes an output unit 15 such as a speaker, a light emitting member, and an indicator and an input unit 16 such as a microphone and a switch. To be more specific, the power-receiving device 1 includes electronic components 13 such as an AC/DC converter 131*a*, a charging unit 132, and a controller 133. At least one of these electronic components 13 is provided in the magnetic field space which is formed by the resonance phenomenon to have a lower magnetic field strength than the other parts.

The AC/DC converter 131 has a function of converting AC power supplied to the power-receiving module 11 into DC power. The charging unit 132 has a function of charging the battery 14. The controller 133 is connected to the output unit 15 and the input unit 16 and has a function of outputting a control signal to the output unit 15, a function of receiving an input signal from the input unit 16, and a function of processing different types of information and data corresponding to the use of the power-receiving device 1. While in the present embodiment the battery 14, the output unit 15, and the input unit 16 are recited to be independent from the electronic component 13 for the sake of convenience, the electronic component 13 may include the battery 14, the output unit 15, and the input unit 16. In other words, the battery 14, the output unit 15, and the input unit 16 may be provided in the magnetic field space.

The battery 14 charged by the charging unit 132 is constituted by a rechargeable secondary battery. Examples of the battery 14 include a lead storage battery, a lithium ion secondary battery, lithium ion polymer secondary battery, a nickel hydrogen storage battery, a nickel cadmium storage battery, a nickel iron storage battery, a nickel $Z_{in}c$ storage battery, and a silver oxide $Z_{in}c$ storage battery. The battery 14 may not be a secondary battery but a capacitor.

(Power-Supplying Device 2)

The power-receiving device 1 arranged as above and the power-supplying device 2 constitute a power-supplying system 3. The power-supplying device 2 includes a power-supplying module 21 which supplies power to the power-receiving module 11 of the power-receiving device 1 by the resonance phenomenon. The power-supplying module 21 includes a power-supplying resonance coil 211 and a power-supplying coil 212. The power-supplying device 2 includes a power source unit 22 supplying AC power to the power-supplying module 21 and a controller 23 controlling the power source unit 22.

(Magnetic Field Space)

Now, the magnetic field space which is mainly used as a place where the electronic component 13 of the power-receiving device 1 is provided will be detailed.

The power-receiving device 1 is arranged so that a magnetic field space is formed at a desired position. The formation of the magnetic field space at the desired position is realized by setting power supply conditions such as a positional relation with the power-supplying device 2, a power-supplying state, and an internal structure. Furthermore, the formation of the magnetic field space at the desired position is realized by setting magnetic member conditions by which the coupling coefficient of the power-supplying resonance coil 211 of the power-supplying module 21 and the power-receiving resonance coil 111 of the power-receiving module 11 can be increased or decreased.

For example, the power-receiving device 1 may be arranged such that, when power is supplied by the resonance phenomenon from the power-supplying resonance coil 211 of the power-supplying module 21 of the power-supplying device 2 to the power-receiving resonance coil 111 of the power-receiving module 11, at a desired position between the power-supplying resonance coil 211 of the power-supplying module 21 and the power-receiving resonance coil 111 of the power-receiving module 11, a magnetic field space having a magnetic field strength lower than the magnetic field strengths in parts other than the desired position is formed. With this arrangement, a magnetic field space is formed in the vicinity of the power-receiving module 11 on the power-supplying device 2 side.

A method of forming a magnetic field space will be detailed. When power is supplied from the power-supplying resonance coil 211 of the power-supplying module 21 of the power-supplying device 2 to the power-receiving resonance coil 111 of the power-receiving module 11 of the power-receiving device 1 by the resonance phenomenon, for example, the frequency of the power supplied to the power-supplying resonance coil 211 of the power-supplying module 21 is set in such a way that the direction of the current flowing in the power-supplying resonance coil 211 of the power-supplying module 21 is opposite to the direction of the current flowing in the power-receiving resonance coil 111 of the power-receiving module 11.

In the formation method above, when power transmission using the resonance phenomenon is performed, the coupling coefficient indicating the strength of the coupling between the power-supplying resonance coil 211 and the power-receiving resonance coil 111 is increased as the power-supplying resonance coil 211 of the power-supplying module 21 and the power-receiving resonance coil 111 of the power-receiving module 11 are disposed to be close to each other. When the coupling coefficient is high in this manner, the measurement of a transmission characteristic (which is either a value used as an index of power transmission efficiency when power is supplied from the power-supplying coil 212 to the power-receiving coil 112 or a value used as an index of power transmission efficiency when power is supplied from the power-supplying module 21 to the power-receiving module 11) shows that a measured waveform has two separated peaks on the low frequency side and the high frequency side, respectively. As the frequency of the power supplied to the power-supplying resonance coil 211 is set at a frequency around the peak on the high frequency side, the direction of the current flowing in the power-supplying resonance coil 211 is arranged to be opposite to the direction of the current flowing in the power-receiving resonance coil 111, and hence the magnetic field generated on the inner circumference side of the power-supplying resonance coil 211 and the magnetic field generated on the inner circumference side of the power-receiving resonance coil 111 cancel each other out, with the result that an influence of the magnetic field is reduced on the inner circumference sides of the power-supplying resonance coil 211 and the power-receiving resonance coil 111. With this, a magnetic field space having a magnetic field strength lower than the magnetic field strengths in parts other than the inner circumference sides of the power-supplying resonance coil 211 and the power-receiving resonance coil 111 is formed.

In another method of forming a magnetic field space, for example, when power is supplied from the power-supplying resonance coil 211 to the power-receiving resonance coil 111 by the resonance phenomenon, the frequency of the power supplied to the power-supplying resonance coil 211 is set so that the direction of the current flowing in the power-supplying resonance coil 211 is identical with the direction of the current flowing in the power-receiving resonance coil 111.

According to the method above, when power transmission using the resonance phenomenon is performed, the coupling coefficient indicating the strength of the coupling between the power-supplying resonance coil 211 and the power-receiving resonance coil 111 is increased as the power-supplying resonance coil 211 and the power-receiving resonance coil 111 are disposed to be close to each other. When the coupling coefficient is high in this manner, the measurement of the transmission characteristic shows that a measured waveform has two separated peaks on the low frequency side and the high frequency side, respectively. As the frequency of the power supplied to the power-supplying resonance coil 211 is set at a frequency around the peak on the low frequency side, the direction of the current flowing in the power-supplying resonance coil 211 is arranged to be identical with the direction of the current flowing in the power-receiving resonance coil 111, and hence the magnetic field generated on the outer circumference side of the power-supplying resonance coil 211 and the magnetic field generated on the outer circumference side of the power-receiving resonance coil 111 cancel each other out, with the result that an influence of the magnetic field is reduced on the outer circumference sides of the power-supplying resonance coil 211 and the power-receiving resonance coil 111. With this, a magnetic field space having a magnetic field strength lower than the magnetic field strengths in parts other than the outer circumference sides of the power-supplying resonance coil 211 and the power-receiving resonance coil 111 is formed.

In addition to the above, the size of the magnetic field space may be set based on the strength of the magnetic coupling between the power-supplying resonance coil 211 and the power-receiving resonance coil 111, by changing adjustment parameters regarding the power-supplying resonance coil 211 and the power-receiving resonance coil 111. For example, the size of the magnetic field space is increased by relatively weakening the magnetic coupling between the power-supplying resonance coil 211 and the power-receiving resonance coil 111. In the meanwhile, the size of the magnetic field space is decreased by relatively strengthening the magnetic coupling between the power-supplying resonance coil 211 and the power-receiving resonance coil 111. As such, a magnetic field space optimum for the size of the power-receiving device 1 is formed.

Alternatively, the size of the magnetic field space may be changed in such a way that the arrangement relation of the power-supplying resonance coil 211 and the arrangement relation of the power-receiving resonance coil 111 are used as the adjustment parameters, and the adjustment parameters are changed to change the strength of the magnetic coupling between the power-supplying resonance coil 211 and the power-receiving resonance coil 111.

Furthermore, the shape of the magnetic field space may be arranged to be a desired shape in such a way that the shapes of the power-supplying resonance coil 211 and the power-receiving resonance coil 111 are used as the adjustment parameters, and the shapes of these coils are changed in a desirable manner to change the strength of the magnetic coupling between and around the power-supplying resonance coil 211 and the power-receiving resonance coil 111. In this case, as the power-supplying resonance coil 211 and the power-receiving resonance coil 111 are arranged to have desired shapes, a magnetic field space having a relatively low magnetic field strength is formed with a desired shape corresponding to the shapes of the coils.

In addition to the above, the size of the magnetic field space may be set in such a way that at least one of the first distance between the power-supplying resonance coil 211 and the power-supplying coil 212 and the second distance between the power-receiving coil 112 and the power-receiving resonance coil 111 is used as an adjustment parameter, and the size is set based on this adjustment parameter. For example, the size of the magnetic field space is increased in such a way that the first distance between the power-supplying resonance coil 211 and the power-supplying coil 212 and the second distance between the power-receiving coil 112 and the power-receiving resonance coil 111 are relatively shortened so that the magnetic coupling is relatively weakened. In the meanwhile, the size of the magnetic field space is decreased in such a way that the first distance between the power-supplying resonance coil 211 and the power-supplying coil 212 and the second distance between the power-receiving coil 112 and the power-receiving resonance coil 111 are relatively elongated so that the magnetic coupling is relatively strengthened.

The magnetic field space may be formed in such a way that, in the power-receiving resonance coil 111, power is supplied by a resonance phenomenon having peaks at a drive frequency band in which the value of the transmission characteristic with respect to the drive frequency of the power supplied to the power-supplying module 21 is lower than the resonance frequency and at a drive frequency band in which the value is higher than the resonance frequency. In this connection, the location where the magnetic field space appears is changed between a case where, at the peak frequency in the low drive frequency band, the direction of the current flowing in the power-supplying resonance coil 211 of the power-supplying module 21 is arranged to be identical with the direction of the current flowing in the power-receiving resonance coil 111 are identical (in-phase) and a case where the directions of the currents are arranged to be opposite (reversed-phase).

In addition to the above, the magnetic field space may be formed at a desired position with a magnetic field strength lower than the magnetic field strengths in parts other than the desired position, in such a manner that, the magnetic member 17 is provided to cover at least a part of the power-receiving resonance coil 111 and the power-supplying resonance coil 211 except the surfaces where these coils oppose each other, and power transmission is carried out by changing the magnetic field between the power-supplying resonance coil 211 and the power-receiving resonance coil 111.

The magnetic member 17 may be provided to cover the inner circumferential surface of the power-receiving resonance coil 111. In this case, by blocking the magnetic field generated on the inner circumference side of the power-receiving resonance coil 111, a magnetic field space having a relatively low magnetic field strength is formed on the inner circumference side of the power-receiving resonance coil 111.

In addition to the above, the magnetic member 17 may be provided to cover the surfaces of the power-supplying resonance coil 211 and the power-receiving resonance coil 111, which surfaces are opposite to the surfaces where the coils oppose each other. In this case, by blocking the magnetic field generated at around the surface opposite to the opposing surface of the power-receiving resonance coil 111, a magnetic field space having a relatively low magnetic field strength is formed at around the surface opposite to the opposing surface of the power-receiving resonance coil 111.

As such, the power-receiving device 1 is arranged such that, based on a combination of at least one of the above-described methods of forming the magnetic field space, a magnetic field space having a low magnetic field strength can be intentionally formed at will at and around the inner side of the power-receiving module 11, and the size and shape of the magnetic field space can be arbitrarily set. In other words, in the power-receiving device 1, a desired magnetic field space can be formed by adjusting at least one of the layout of the power-receiving module 11 (including the degree of overlap of the power-receiving resonance coil 111 and the power-receiving coil 112 and the positional relation of the inner circumference and the outer circumference) and the magnetic member conditions.

(Research Using Measurement System)

Now, in regard to the power-receiving device 1 described above, an inductance value (L3:L4) and a resistance value (R3:R4) of the power-receiving resonance coil 111 and the power-receiving coil 112 when the power-receiving resonance coil 111 overlaps the power-receiving coil 112, a coupling coefficient $k_{34}$ between the power-receiving resonance coil 111 and the power-receiving coil 112, an input impedance $Z_{in}$, a receiving voltage, and a current value of the power-receiving resonance coil 111 were researched.

(Measurement System: Coil Layout of Power-Receiving Module 11)

Figure 2:
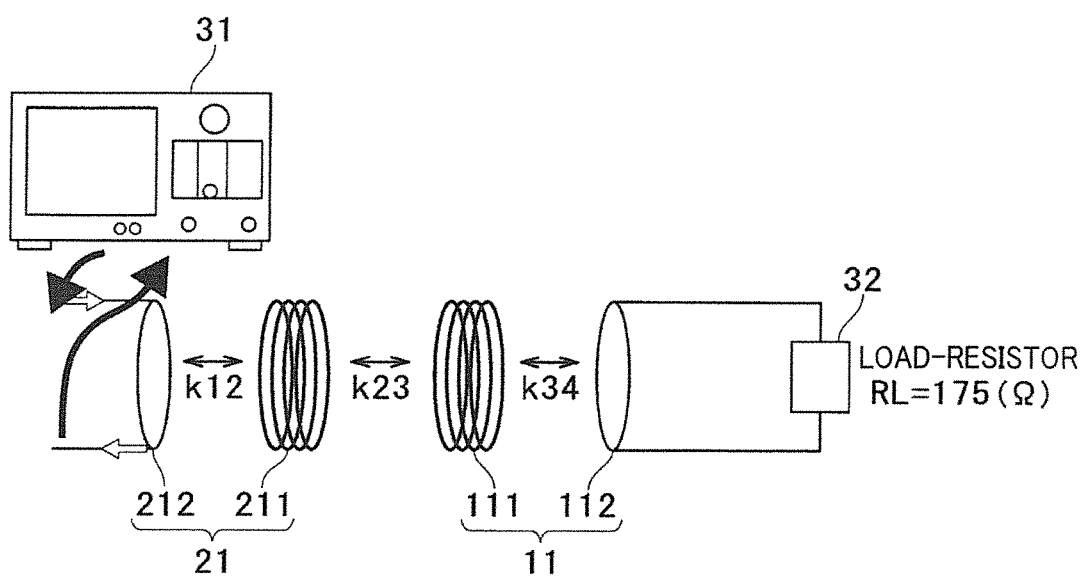
FIG. 2 illustrates the measurement of impedance.

To begin with, as shown in FIG. 2, the coil layout of the power-supplying module 21 in the measurement system will be described. The power-supplying coil 212 of the power-supplying module 21 is made of a copper wire material (coated with an insulation film) with a wire diameter of 0.4 mmϕ, and is 15 mmϕ in coil diameter. The power-supplying resonance coil 211 is made of a copper wire material (coated with an insulation film) with a wire diameter of 0.4 mmϕ, and is 15 mmϕ in coil diameter. On the inner circumference side of the power-supplying resonance coil 211, an unillustrated magnetic member which is 450 μm thick is provided according to need. The power-supplying resonance coil 211 and the power-supplying coil 212 have a self inductance L of 3.1 pH and a resistance value of 0.65 Ω.

Now, the structure of the power-receiving module 11 will be described. The power-receiving resonance coil 111 and the power-receiving coil 112 are disposed in accordance with one of the following four coil layouts. In the present embodiment, the first to fourth coil layouts are described as examples with which the inductance is maximized (i.e., the degree of freedom in design is high) with a desired coupling coefficient.

To be more specific, in the first coil layout, provided that the power-supplying module 21 side is the front side, the power-receiving resonance coil 111 is provided on the inner circumference side of the front side and the power-receiving coil 112 is provided in an overlapping manner on the rear side of the outer circumference side of the power-receiving resonance coil 111. On the inner circumference side of the power-receiving resonance coil 111 and the power-receiving coil 112, the magnetic member 17 which is cylindrical in shape, 450 μm in thickness, and 3 mm in length is provided.

The power-receiving resonance coil 111 provided on the inner circumference side is made of a copper wire material (coated with an insulation film) with a wire diameter of 0.12 mmϕ and is 11 mmϕ in coil diameter. The power-receiving coil 112 provided on the outer circumference side is made of a copper wire material (coated with an insulation film) with a wire diameter of 0.12 mmϕ, and is 11.24 mmϕ in coil diameter. The power-receiving resonance coil 111 and the power-receiving coil 112 are 2.16 mm and 2.16 mm in coil length, respectively. The coil length of the power-receiving module 11, i.e., the total coil length excluding the length of the overlapped parts of the power-receiving resonance coil 111 and the power-receiving coil 112 is arranged to be 3 mm.

In the second coil layout, the power-receiving resonance coil 111 is provided on the outer circumference side on the front side, and the power-receiving coil 112 is provided in an overlapping manner on the rear side of the inner circumference side of the power-receiving resonance coil 111. To be more specific, the power-receiving resonance coil 111 provided on the outer circumference side is made of a copper wire material (coated with an insulation film) with a wire diameter of 0.12 mmϕ and is 11.24 mmϕ in coil diameter. The power-receiving coil 112 provided on the inner circumference side is made of a copper wire material (coated with an insulation film) with a wire diameter of 0.12 mmϕ and is 11 mmϕ in coil diameter. The power-receiving resonance coil 111 and the power-receiving coil 112 are 2.16 mm and 2.16 mm in coil length, respectively. The arrangements other than the above are identical with those of the first coil layout.

In the third coil layout, the power-receiving resonance coil 111 is provided on the inner circumference side and the power-receiving coil 112 is provided in an overlapping manner on the rear side of the outer circumference side of the power-receiving resonance coil 111. To be more specific, the power-receiving resonance coil 111 provided on the inner circumference side is made of a copper wire material (coated with an insulation film) with a wire diameter of 0.12 mmϕ and is 11 mmϕ in coil diameter. The power-receiving coil 112 provided on the outer circumference side is made of a copper wire material (coated with an insulation film) with a wire diameter of 0.12 mmϕ and is 11.24 mmϕ

In the fourth coil layout, the power-receiving resonance coil 111 is provided on the outer circumference side and the power-receiving coil 112 is provided in an overlapping manner on the rear side of the inner circumference side of the power-receiving resonance coil 111. To be more specific, the power-receiving resonance coil 111 provided on the outer circumference side is made of a copper wire material (coated with an insulation film) with a wire diameter of 0.12 mmϕ and is 11.24 mmϕ in coil diameter. The power-receiving coil 112 provided on the inner circumference side is made of a copper wire material (coated with an insulation film) with a wire diameter of 0.12 mmϕ, and is 11 mmϕ in coil diameter. The power-receiving resonance coil 111 and the power-receiving coil 112 are 3 mm and 1.2 mm in coil length, respectively. The arrangements other than the above are identical with those of the first coil layout.

(Measurement System: Method of Measuring Impedance $Z_{in}$)

As shown in FIG. 2, the power-supplying module 21 and the power-receiving module 11 arranged as above are disposed to oppose each other. To the power-receiving coil 112, a 175Ω load-resistor 32 is connected as a load. Furthermore, to one end and the other end of the power-supplying coil 212, terminals of a network analyzer 31 (Agilent Technologies, Inc: E5061B) are connected in place of the AC power source. An impedance $Z_{in}$ at 1050 kHz (which is the peak on the high frequency side) is measured by the network analyzer 31, when the power-supplying coil 212, the power-supplying resonance coil 211, the power-receiving resonance coil 111, and the power-receiving coil 112 are resonated at a resonance frequency of 950 kHz.

(Measurement System: Method of Measuring Receiving Voltage and Current of Resonator)

Figure 3:
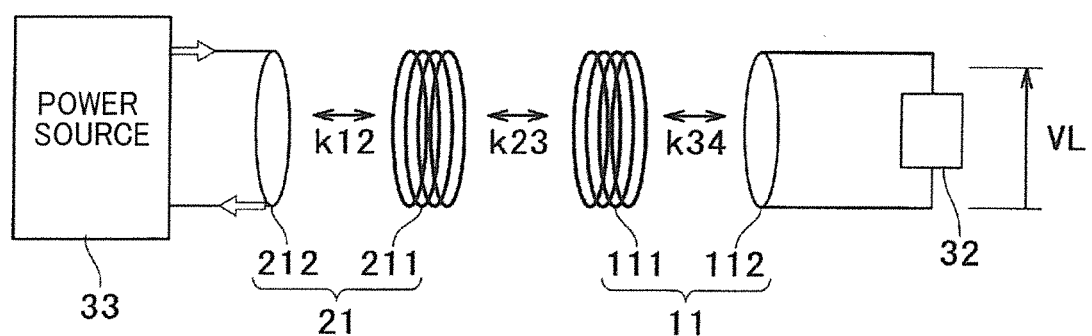
FIG. 3 illustrates the measurement of a receiving voltage.

As shown in FIG. 3, the power-supplying module 21 and the power-receiving module 11 arranged as above are disposed to oppose each other. To the power-receiving coil 112, a 175Ω load-resistor 32 is connected as a load. Furthermore, one end and the other end of the power-supplying coil 212 are connected to a 5V AC power source 33, and the voltage between the ends of the load-resistor 32 is measured as a receiving voltage by an oscilloscope (Agilent Technologies, Inc: MSO-X3054A). A current of the resonator (power-receiving resonance coil 111) is obtained based on the measured receiving voltage at 1050 kHz (which is the peak on the high frequency side), when the power-supplying coil 212, the power-supplying resonance coil 211, the power-receiving resonance coil 111, and the power-receiving coil 112 are resonated at a resonance frequency of 950 kHz.

(Measurement System: When Coupling Coefficient $k_{12}$ is Fixed)

In the measurement system above, an inductance L3:L4 of the power-receiving resonance coil 111 and the power-receiving coil 112 is actually measured and a resistance value R3:R4 is actually measured. Furthermore, a coupling coefficient $k_{34}$ between the power-receiving resonance coil 111 and the power-receiving coil 112 is obtained. Furthermore, an impedance $Z_{in}$ when the coupling coefficient $k_{12}$ between the power-supplying resonance coil 211 and the power-supplying coil 212 is 0.457 and the coupling coefficient k23 between the power-supplying resonance coil 211 and the power-receiving resonance coil is 0.187, a value of the receiving voltage and a current value of the resonator which is the power-receiving resonance coil 111 are obtained.

The power-receiving modules 11 of the first to fourth layouts were applied to the measurement system above, and the measurement items such as the receiving voltage were obtained by actual measurement or calculation. As a result, as shown in FIG. 4, in the power-receiving module 11 of the first layout, the inductance L3:L4 (ρH) was 7.5:6.4. The resistance value R3:R4 (Ω) was 1.9:1.5. The coupling coefficient $k_{34}$ was 0.85. The impedance $Z_{in}$ was 27.4Ω. The receiving voltage was 9.5V. The current of the resonator which was the power-receiving resonance coil 111 was 0.250 A.

In the power-receiving module 11 of the second layout, the inductance L3:L4 (ρH) was 6.4:7.5. The resistance value R3:R4 (Ω) was 1.5:1.9. The coupling coefficient $k_{34}$ was 0.85. The impedance $Z_{in}$ was 26.3Ω. The receiving voltage was 10.0V. The current of the resonator which was the power-receiving resonance coil 111 was 0.263 A.

In the power-receiving module 11 of the third layout, the inductance L3:L4 (ρH) was 14.5:2.9. The resistance value R3:R4 (Ω) was 2.9:1.0. The coupling coefficient $k_{34}$ was 0.85. The impedance $Z_{in}$ was 42.6Ω. The receiving voltage was 6.9V. The current of the resonator which was the power-receiving resonance coil 111 was 0.190 A.

In the power-receiving module 11 of the fourth layout, the inductance L3:L4 (μH) was 11.9:4.3. The resistance value R3:R4 (Ω) was 2.4:1.4. The coupling coefficient $k_{34}$ was 0.85. The impedance $Z_{in}$ was 34.4Ω. The receiving voltage was 8.3V. The current of the resonator which was the power-receiving resonance coil 111 was 0.207 A.

The measurement results above indicate that, even if the distance between the power-supplying resonance coil 211 and the power-receiving resonance coil 111 is not changed, a desired one of control items such as a receiving voltage and a current of the power-receiving resonance coil 111 can be set at a target value, by adjusting the degree of overlap of the power-receiving resonance coil 111 and the power-receiving coil 112 and the layout of the power-receiving resonance coil 111 and the power-receiving coil 112.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious to those skilled in the art that the other structures, systems, methods and the like are possible, within the spirit of the invention described in the present specification. The description of claims therefore shall encompass structures equivalent to the present invention, unless otherwise such structures are regarded as to depart from the spirit and scope of the present invention. To fully understand the object and effects of the present invention, it is strongly encouraged to sufficiently refer to disclosures of documents already made available.

REFERENCE SIGNS LIST

1 POWER-RECEIVING DEVICE
2 POWER-SUPPLYING DEVICE
3 POWER-SUPPLYING SYSTEM
11 POWER-RECEIVING MODULE
111 POWER-RECEIVING RESONANCE COIL
112 POWER-RECEIVING COIL
21 POWER-SUPPLYING MODULE
211 POWER-SUPPLYING RESONANCE COIL
212 POWER-SUPPLYING COIL
17 MAGNETIC MEMBER

The invention claimed is:

1. A power-receiving/supplying device comprising:
    a coil module configured to receive and supply power from and to another coil module by a resonance phenomenon; and
    an electronic component provided in a magnetic field space which is formed by the resonance phenomenon to have a lower magnetic field strength than other parts,
    the coil module including:
        a resonance coil which is resonated with said another coil module; and
        a power-receiving/supplying coil which partly overlaps the resonance coil in a coil diameter direction and is configured to receive and supply power from and to the resonance coil.

2. The power-receiving/supplying device according to claim 1, wherein each of the resonance coil and the power-receiving/supplying coil is a solenoid coil.

3. A portable device comprising the power-receiving/supplying device according to claim 1.

4. The portable device according to claim 3, further comprising an outer wall member exposed to the outside, at least a part of the coil module of the power-receiving/ supplying device being provided along a surface shape of the outer wall member.

* * * * *